Patented Apr. 24, 1945

2,374,335

UNITED STATES PATENT OFFICE 2,374,335

TRIAZOLE DERIVATIVES

Gaetano F. D'Alelio, Pittsfield, Mass., assignor to General Electric Company, a corporation of New York No Drawing. Application December 26, 1942, Serial No. 470,220

14 Claims. (Cl. 260—308)

This invention relates to new chemical compounds and more particularly to triazole derivatives. The invention especially is concerned with the production of new and useful acylaminoarylamino triazoles.

The triazole derivatives of this invention may be represented by the following general formula:

I
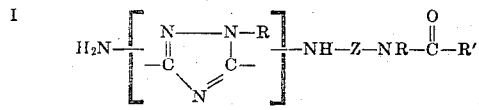

where R represents a member of the class consisting of hydrogen and monovalent hydrocarbon radicals, R' represents a monovalent hydrocarbon radical, and Z represents a member of the class consisting of divalent aromatic and nuclearly substituted, more particularly nuclearly halogenated, aromatic hydrocarbon radicals.

Illustrative examples of monovalent hydrocarbon radicals that R and R' in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiarybutylphenyl, methylnaphthyl, etc.); and arylsubstituted aliphatic (e. g., benzyl, cinnamyl, phenylethyl, phenylpropyl, etc.). Preferably R represents hydrogen, in which case the compounds correspond to the following general formula:

II
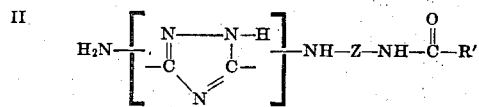

where Z and R' have the same meanings as given above with reference to Formula I. However, there also may be produced in accordance with the present invention chemical compounds corresponding to the following general formulas:

III
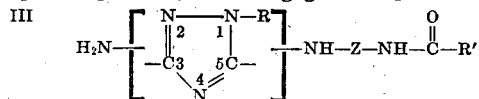

IV
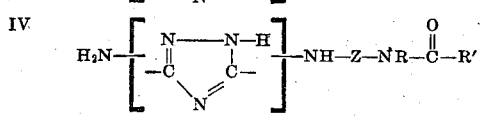

where R, R' and Z have the same meanings as given above with reference to Formula I.

Illustrative examples of divalent radicals that Z in the above formulas may represent are: divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, 1,4-dimethyl 2,3-phenylene, etc.; radicals that may be classed either as divalent aliphatic-substituted aromatic or as divalent aromatic-substituted aliphatic and wherein the free bond of the aromatic nucleus is attached to the acylamino radical, e. g., 4,alpha-tolylene, 3,beta-phenyleneethyl, 4,alpha-xylylene, 2,gamma-phenylenebutyl, etc.; and their homologues, as well as those divalent radicals with one or more of their nuclear hydrogen atoms replaced by a substituent, e. g., acyl, alkyl, alkenyl, hydroxy, alkoxy, aryloxy, carboalkoxy, carboaroxy, sulfamyl, an acylamino

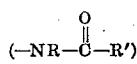

grouping in addition to the single acylamino grouping shown, for example, in Formula I, etc. Specific examples of substituted divalent radicals that Z may represent are chlorophenylene, bromophenylene, chloroxenylene, chloronaphthylene, chlorotolylene, bromotolylene, ethoxyphenylene, actophenylene, actoxyphenylene, aminophenylene, carboethoxyphenylene, sulfamylphenylene, carbophenoxyphenylene, hydroxyphenylene, phenoxyphenylene, methylphenylene (tolylene), allylphenylene, etc. Preferably Z is phenylene or tolylene.

The new compounds of this invention may be used, for example, as pharmaceuticals, insecticides, fungicides, plasticizers and as intermediates in the preparation of derivatives thereof, e. g., ureido, acyl, hydrazino, carbamyl, amidine, methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxy-aldehydes and aldehyde-addition products, to yield condensation products having particular utility in the plastics and coating arts. Such condensation products are more fully described and are specifically claimed in my copending application Serial No. 470,219, filed concurrently herewith and assigned to the same assignee as the present invention.

Various methods may be employed to produce the chemical compounds of this invention. I prefer to prepare them by effecting reaction under heat between a hydrazine corresponding to the general formula

V        NH₂—NHR where R has the same meaning as given above with reference to Formula I, and an acylaminoaryl biguanide corresponding to the general formula

VI
$$NH_2-\overset{NH}{\underset{\parallel}{C}}-NH-\overset{NH}{\underset{\parallel}{C}}-NH-Z-NR-\overset{O}{\underset{\parallel}{C}}-R'$$

where R, R' and Z have the same meanings as given above with reference to Formula I. This reaction is carried out under conditions such as will result in the formation of ammonia, or, if an acid is present, an ammonium salt as a by-product of the reaction. This reaction may be represented by the following general equation:

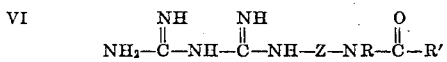
VII
$$NH_2-NHR + NH_2-\overset{NH}{\underset{\parallel}{C}}-NH-\overset{NH}{\underset{\parallel}{C}}-NH-Z-NR-\overset{O}{\underset{\parallel}{C}}-R' \longrightarrow$$

$$H_2N-\left[\begin{array}{c}N\text{---}N-R\\ -C\quad\quad C-\\ \diagdown N\diagup\end{array}\right]-NH-Z-NR-\overset{O}{\underset{\parallel}{C}}-R' + 2NH_3$$

Or, when the reaction is carried out in the presence of an acid effective in binding the ammonia liberated during the reaction, it may be represented by the following general equation:

VIII
$$NH_2-NHR + NH_2-\overset{NH}{\underset{\parallel}{C}}-NH-\overset{NH}{\underset{\parallel}{C}}-NH-Z-NR-\overset{O}{\underset{\parallel}{C}}-R' \xrightarrow{2HA}$$

$$H_2N-\left[\begin{array}{c}N\text{---}N-R\\ -C\quad\quad C-\\ \diagdown N\diagup\end{array}\right]-NH-Z-NR-\overset{O}{\underset{\parallel}{C}}-R' + 2NH_3\cdot HA$$

In Equations VII and VIII, R, R' and Z have the same meanings as given above with reference to Formula I, and HA (Equation VIII) represents an acid, which may be either organic or inorganic but which preferably is inorganic. Illustrative examples of organic and inorganic acids that may be used to bind the ammonia in the form of a salt are oxalic, acetic, hydrochloric, hydrobromic, sulfuric, etc. The reaction advantageously is carried out in an aqueous solution containing an inorganic acid. However, other solvents or mixtures of solvents may be used, e. g., alcohols, ethers, dioxane, benzene, etc. The reaction may be carried out under a variety of temperature and pressure conditions. Ordinarily the reaction is effected at atmospheric pressure under reflux at the boiling temperature of the reaction mass.

The acid represented by HA in Equation VIII may constitute one of the starting materials, together with the hydrazine and the acylaminoaryl biguanide. Or, if desired, the acid may be introduced into the reaction mixture in other forms. For example, a part of the acid may be employed in a free or solution state and a part in the form of a mono salt of the acylaminoaryl biguanide or of the hydrazine; or, a part of the acid may be used in the form of a mono salt of the hydrazine and a part in the form of a mono salt of the acylaminoaryl biguanide.

Illustrative examples of hydrazines that may be used, depending upon the particular end-product desired, are:

Hydrazine (or hydrazine hydrate)
Methyl hydrazine
Ethyl hydrazine
Propyl hydrazine
Isobutyl hydrazine
Phenyl hydrazine
Allyl hydrazine
Propenyl hydrazine
Cyclohexyl hydrazine
Tolyl hydrazines
Xylyl hydrazines
Phenethyl hydrazine
Ethylphenyl hydrazines
Octyl hydrazine
Naphthyl hydrazines Illustrative examples of acylaminoaryl biguanides that may be employed, depending upon the particular end-product desired, are:

Acetylaminophenyl biguanides (acetamidophenyl biguanides), including ortho-(acetylamino) phenyl biguanide, meta-(acetylamino) phenyl biguanide and para-(acetylamino) phenyl biguanide Acetylaminotolyl biguanides, which may be represented by the formula

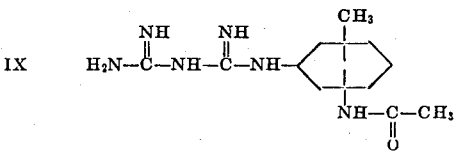

Acetylaminoxylyl biguanides
Acetylaminonaphthyl biguanides
Acetylaminoxenyl biguanides, which may be represented by the formula

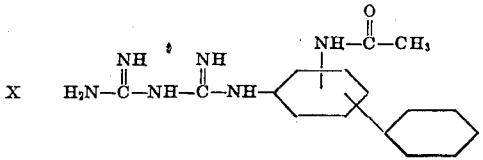

or by the formula

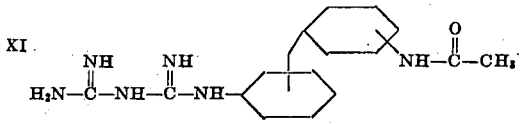

Propanoylaminophenyl biguanides
Butanoylaminophenyl biguanides
Butanoylaminotolyl biguanides
Isobutanoylaminoxylyl biguanides
Propenoylaminophenyl biguanides
Propenoylaminonaphthyl biguanides
Cyclopentanoylaminophenyl biguanides
Benzoylaminophenyl biguanides
Acetylamino-(chloro)-phenyl biguanides, which may be represented by the formula

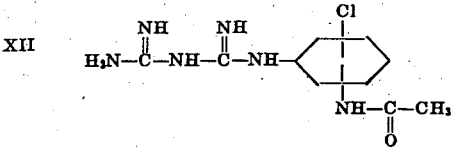

Acetylamino-(bromo)-phenyl biguanides
Propanoylamino-(chloro)-tolyl biguanides
Acetylamino-(iodo)-phenyl biguanides
Acetylamino-(fluoro)-phenyl biguanides Toluylaminoxenyl biguanides, which may be represented by the formula

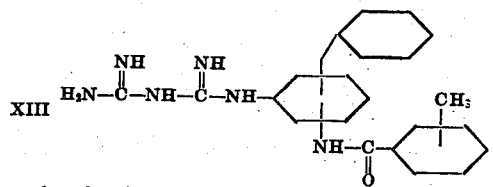

or by the formula

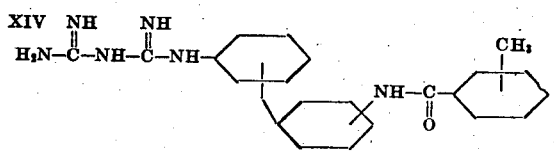

(N-methyl acetylaminophenyl) biguanides
(N-ethyl propanoylamino ethylphenyl) biguanides
(N-isobutyl benzoylamino methylnaphthyl) biguanides
(N-cyclopentyl benzoylamino phenyl) biguanides
(N-phenyl methylcyclopentanoylamino chlorophenyl) biguanides, which may be represented by the formula

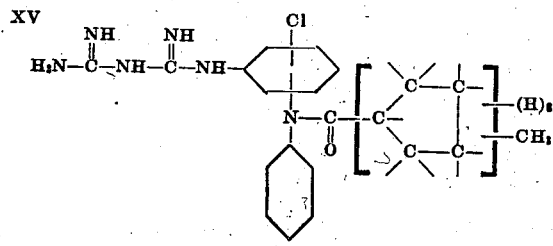

(N-xenyl acetylamino bromotolyl) biguanides, which may be represented by the formula

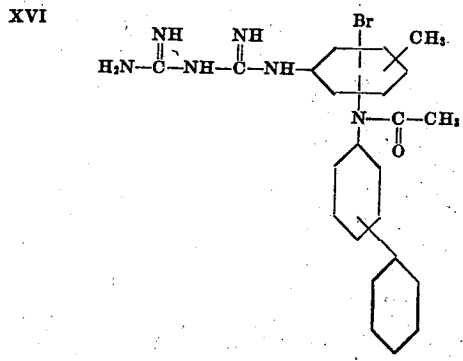

Ethylbenzoylaminophenyl biguanides.

The acylaminoaryl biguanides used in practicing the present invention are prepared, for example, by effecting reaction between biguanide or dicyandiamide (cyanoguanidine) and an acylaminoaryl amine, preferably in the presence of an inorganic acid.

In order that those skilled in the art better may understand how the present invention may be carried into effect, the following examples are given by way of illustration and not by way of limitation. All parts are by weight.

Example 1

This example illustrates the preparation of (paraacetamido anilino) amino 1,2,4-triazoles, which also may be named (para-acetylamino phenylamino) amino 1,2,4-triazoles, or (para-acetylamino anilino) amino 1,2,4-triazoles, or (para-acetamido phenylamino) amino 1,2,4-triazoles.

| | Parts |
|---|---|
| (Para-acetamido phenyl) biguanide hydrochloride | 135.2 |
| Hydrazine hydrate (in 34.5 parts water) | 25.0 |
| Concentrated aqueous solution of hydrochloric acid (approx. 38% HCl) | 48.0 |
| Water | 200.0 | were heated together under reflux at the boiling temperature of the mass for 18 hours, after which the solution was evaporated to dryness to yield a gummy, semi-crystalline mass. This mass was dissolved in boiling ethyl alcohol. The alcohol-insoluble material, mostly ammonium chloride, was removed by filtration. The filtrate was treated with a de-colorizing carbon to decolorize it, after which it was concentrated by evaporation. While still hot, ether was added to the concentrated filtrate until a solid began to precipitate from the solution. The solution was chilled to obtain a maximum yield of solid precipitate comprising (para-acetamido anilino) amino 1,2,4-triazoles. The product was removed from the solution by filtration and dried. The dried material had a melting point of about 200° C. with some indication of decomposition at this temperature.

The corresponding ortho and meta derivatives are prepared by using 135.2 parts of (ortho-acetamido phenyl) biguanide hydrochloride or (meta-acetamido phenyl) biguanide hydrochloride instead of 135.2 parts of (para-acetamido phenyl) biguanide hydrochloride.

Example 2

1-methyl (para-acetamido anilino) amino 1,2,4-triazoles are prepared in essentially the same manner as described under Example 1 with the exception that 23 parts of methyl hydrazine are used in place of 25 parts of hydrazine hydrate.

Example 3

1-phenyl (para-acetamido anilino) amino 1,2,4-triazoles are prepared in essentially the same manner as described under Example 1 with the exception that 54 parts of phenyl hydrazine are used instead of 25 parts of hydrazine hydrate.

Example 4

(Para-propanamido anilino) amino 1,2,4-triazoles are produced in essentially the same manner as described under Example 1 with the exception that 142.2 parts of (para-propanamido phenyl) biguanide hydrochloride, which also may be named (para-propanoylamino phenyl) biguanide of hydrochloride, are used in place of 135.2 parts of (para-acetamido phenyl) biguanide hydrochloride.

Example 5

[(N-methyl para-acetamido) anilino] amino 1,2,4-triazoles are prepared in essentially the same manner as described under Example 1 with the exception that 142.2 parts of [(N-methyl para-acetamido) phenyl] biguanide hydrochloride are used instead of 135.2 parts of (para-acetamido phenyl) biguanide hydrochloride.

More specific examples of compounds embraced by Formula I that may be produced in accordance with the present invention are listed below:

1-methyl (ortho-acetamido anilino) amino 1,2,4-triazoles
1-methyl (meta-acetamido anilino) amino 1,2,4-triazoles 1-phenyl (ortho-acetamido anilino) amino 1,2,4-triazoles
1-phenyl (meta-acetamido anilino) amino 1,2,4-triazoles
(Ortho-propanamido anilino) amino 1,2,4-triazoles, which may be represented by the formula

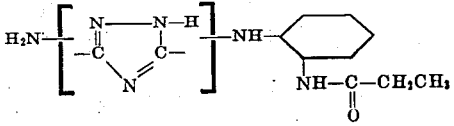

(Meta-propanamido anilino) amino 1,2,4-triazoles
(Acetamido toluido) amino 1,2,4-triazoles, which may be represented by the formula

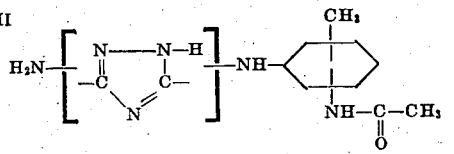

1-ethyl (acetamido anilino) amino 1,2,4-triazoles
1-methyl (acetamido toluido) amino 1,2,4-triazoles
1-phenyl (acetamido toluido) amino 1,2,4-triazoles
(Propanamido toluido) amino 1,2,4-triazoles
(Butanamido toluido) amino 1,2,4-triazoles
(Isobutanamido xylidino) amino 1,2,4-triazoles, which may be represented by the formula

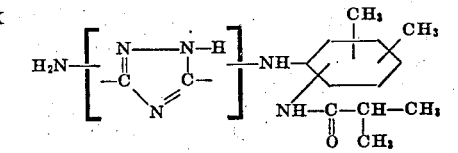

(Propenamido naphthylamino) amino 1,2,4-triazoles
(Cyclopentanamido xenylamino) amino 1,2,4-triazoles
(Benzamido anilino) amino 1,2,4-triazoles
(Hexahydrobenzamido anilino) amino 1,2,4-triazoles
(Benzamido toluido) amino 1,2,4-triazoles
(Toluamido anilino) amino 1,2,4-triazoles
(Toluamido toluido) amino 1,2,4-triazoles
(Acetamido ethyl anilino) amino 1,2,4-triazoles, which may be represented by the formula

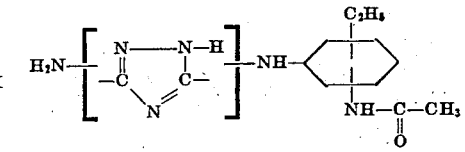

(Benzamido methyl naphthylamino) amino 1,2,4-triazoles
(Dimethylbenzamido fluoro anilino) amino 1,2,4-triazoles, which may be represented by the formula

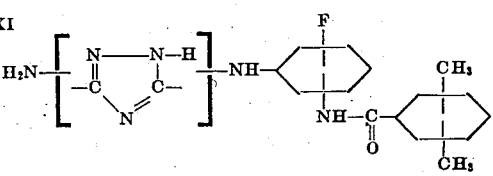

(Naphthamido anilino) amino 1,2,4-triazoles 1-propyl (acetamido toluido) amino 1,2,4-triazoles
1-isobutyl (benzamido anilino) amino 1,2,4-triazoles
1-propenyl (benzamido anilino) amino 1,2,4-triazoles
1-cyclopentyl (acetamido anilino) amino 1,2,4-triazoles
1-phenyl (methylbenzamido xylidino) amino 1,2,4-triazoles
1-methyl [(N-methyl acetamido) anilino] amino 1,2,4-triazoles, which may be represented by the formula

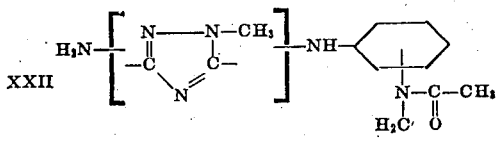

1-benzyl [(N-ethyl acetamido) anilino] amino 1,2,4-triazoles
(Acetamido chloro anilino) amino 1,2,4-triazoles
(Acetamido bromo anilino) amino 1,2,4-triazoles
(Propanamido iodo toluido) amino 1,2,4-triazoles
(Butanamido fluoro toluido) amino 1,2,4-triazoles
1-phenethyl (acetamido anilino) amino 1,2,4-triazoles
1-ethylphenyl (acetamido anilino) amino 1,2,4-triazoles
[(N-phenyl acetamido) anilino] amino 1,2,4-triazoles
[(N-ethyl propanamido) anilino] amino 1,2,4-triazoles
[(N-propyl butanamido) toluido] amino 1,2,4-triazoles, which may be represented by the formula

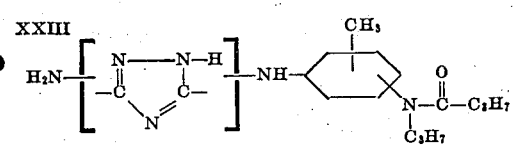

[(N-isobutyl benzamido) xenylamino] amino 1,2,4-triazoles
[(N-phenyl benzamido) anilino] amino 1,2,4-triazoles
[(N-cyclopentyl acetamido) anilino] amino 1,2,4-triazoles
[(N-tolyl acetamido) toluido] amino 1,2,4-triazoles
1-methyl [(N-phenyl acetamido) anilino] amido 1,2,4-triazoles
1-methyl [(N-methyl acetamido) naphthylamino] amino 1,2,4-triazoles
1-phenyl [(N-phenyl acetamido) anilino] amino 1,2,4-triazoles
1-tolyl [(N-benzyl acetamido) propyl anilino] amino 1,2,4-triazoles
1-ethyl [(N-phenethyl acetamido) toluido] amino 1,2,4-triazoles
1-allyl (acetamido anilino) amino 1,2,4-triazoles It will be understood, of course, by those skilled in the art that in the compounds listed above the amino grouping may be attached to either the 3 or the 5 carbon atom of the triazole nucleus, the carbon atom which is not joined to an amino grouping being attached to the acylaminoarylamino grouping; and, also, that the acylamino grouping may be attached to any of the reactive carbon atoms of the aromatic nucleus.

What I claim as new and desire to secure by Letters Patent of the United States is:

1. Chemical compounds corresponding to the general formula

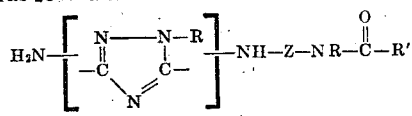

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals.

2. Chemical compounds corresponding to the general formula

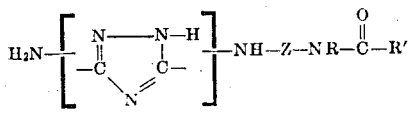

where R represents a member of the class consisting of hydrogen and monovalent hydrocarbon radicals, R' represents a monovalent hydrocarbon radical, and Z represents a divalent aromatic hydrocarbon radical.

3. Chemical compounds corresponding to the general formula

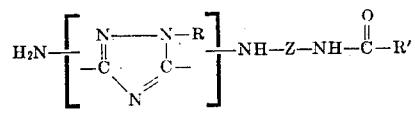

where R represents a member of the class consisting of hydrogen and monovalent hydrocarbon radicals, R' represents a monovalent hydrocarbon radical, and Z represents a divalent aromatic hydrocarbon radical.

4. Chemical compounds corresponding to the general formula

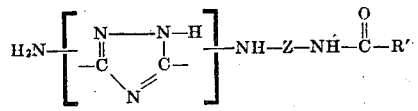

where R' represents a monovalent hydrocarbon radical and Z represents a divalent aromatic hydrocarbon radical.

5. Chemical compounds corresponding to the general formula

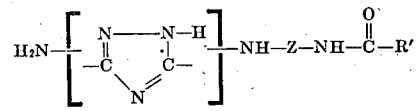

where R' represents a monovalent hydrocarbon radical and Z represents a phenylene radical.

6. Chemical compounds corresponding to the general formula

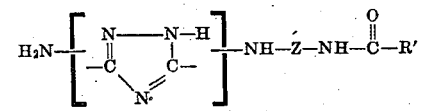

where R' represents an alkyl radical and Z represents a divalent aromatic hydrocarbon radical.

7. Chemical compounds corresponding to the general formula

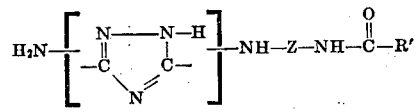

where R' represents an alkyl radical and Z represents a phenylene radical.

8. (Ortho-acetamido anilino) amino 1,2,4-triazoles.

9. (Meta-acetamido anilino) amino 1,2,4-triazoles.

10. (Para-acetamido anilino) amino 1,2,4-triazoles.

11. The method of preparing chemical compounds corresponding to the general formula

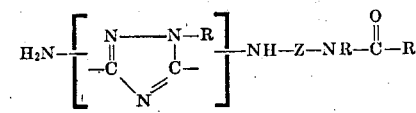

where R represents a member of the class consisting of hydrogen and monovalent hydrocarbon radicals, R' represents a monovalent hydrocarbon radical, and Z represents a member of the class consisting of divalent aromatic and nuclearly halogenated aromatic hydrocarbon radicals, said method comprising effecting reaction under heat between a hydrazine corresponding to the general formula

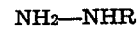

where R has the meaning above given, and an acylaminoaryl biguanide corresponding to the general formula

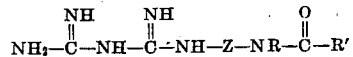

where R, R' and Z have the meanings above given.

12. A method as in claim 11 wherein the reaction is carried out in the presence of an acid effective in binding the ammonia liberated during the reaction.

13. The method of preparing (para-acetamido anilino) amino 1,2,4-triazoles which comprises effecting reaction under heat between (para-acetamido phenyl) biguanide and hydrazine hydrate in the presence of an acid effective in binding the ammonia liberated during the reaction.

14. The method of preparing (para-acetamido anilino) amino 1,2,4-triazoles which comprises effecting reaction under heat between (para-acetamido phenyl) biguanide hydrochloride and hydrazine hydrate, the said reaction being carried out in an aqueous solution containing hydrochloric acid in an amount sufficient to bind the ammonia liberated during the reaction.

GAETANO F. D'ALELIO.

CERTIFICATE OF CORRECTION.

Patent No. 2,374,335.   April 24, 1945.

GAETANO F. D'ALELIO.

It is hereby certified that error appears in the printed specification of the above numbered patent requiring correction as follows: Page 1, first column, line 50, between formula III and formula IV insert the word "and"; and second column, line 30, for "actophenylene, actoxyphenylene" read --acetophenylene, acetoxyphenylene--; page 3, first column, lines 27 to 37 inclusive, for that portion of the formula reading "$H_3N$" read --$H_2N$--; and second column, line 57, after the syllable "nide" strike out "of"; page 4, second column, line 19, for "$H_2C$" read --$H_3C$--; line 53, for "amido" read --amino--; and that the said Letters Patent should be read with this correction therein that the same may conform to the record of the case in the Patent Office.

Signed and sealed this 10th day of July, A. D. 1945.

Leslie Frazer (Seal)   Acting Commissioner of Patents.